United States Patent
Fleming, III

(10) Patent No.: US 8,209,387 B2
(45) Date of Patent: Jun. 26, 2012

(54) METHOD AND SYSTEM FOR FILTERING UNAUTHORIZED ELECTRONIC MAIL MESSAGES

(75) Inventor: Hoyt A. Fleming, III, Boise, ID (US)

(73) Assignee: Round Rock Research, LLC, Mount Kisco, NY (US)

( * ) Notice: Subject to any disclaimer, the term of this patent is extended or adjusted under 35 U.S.C. 154(b) by 169 days.

(21) Appl. No.: 12/642,577

(22) Filed: Dec. 18, 2009

(65) Prior Publication Data

US 2010/0100944 A1 Apr. 22, 2010

Related U.S. Application Data

(63) Continuation of application No. 11/080,104, filed on Mar. 14, 2005, now abandoned, which is a continuation of application No. 09/634,691, filed on Aug. 8, 2000, now Pat. No. 6,868,436, which is a continuation of application No. 08/909,811, filed on Aug. 12, 1997, now Pat. No. 6,249,805.

(51) Int. Cl.
*G06F 15/16* (2006.01)
*G06F 17/30* (2006.01)

(52) U.S. Cl. .......................................... 709/206; 726/4
(58) Field of Classification Search ................ 709/206
See application file for complete search history.

(56) References Cited

U.S. PATENT DOCUMENTS

| | | | | |
|---|---|---|---|---|
| 5,093,918 A | 3/1992 | Heyen et al. | ................ | 709/215 |
| 5,283,856 A | 2/1994 | Gross et al. | ................ | 395/51 |
| 5,377,354 A | 12/1994 | Scannell et al. | ................ | 709/103 |
| 5,619,648 A | 4/1997 | Canale et al. | ................ | 709/206 |
| 5,684,951 A | 11/1997 | Goldman et al. | ................ | 726/6 |
| 5,826,022 A | 10/1998 | Nielsen | ................ | 709/206 |
| 5,864,684 A * | 1/1999 | Nielsen | ................ | 709/206 |
| 5,930,479 A * | 7/1999 | Hall | ................ | 709/238 |
| 5,931,905 A | 8/1999 | Hashimoto et al. | ................ | 709/217 |
| 6,023,723 A | 2/2000 | McCormick et al. | ................ | 709/206 |

(Continued)

OTHER PUBLICATIONS

Barrett, Randy, "ISPs Team Up to Cut Off Spam," May 13, 1997, Inter@ctive Week, http://www5.zdnet.com/zdnn/content/inwk/0415/inwk0028.html, pp. 1-4.

(Continued)

*Primary Examiner* — Ranodhi Serrao
*Assistant Examiner* — Thomas Richardson
(74) *Attorney, Agent, or Firm* — Gazdzinski & Associates, PC

(57) ABSTRACT

A computer system and method for filtering unauthorized electronic mail messages that are sent by senders to a user. The system includes a list of the identifications of the senders who are authorized to send an electronic mail message to the user. When an electronic mail message is received, the system determines whether the sender of the electronic mail message is authorized by determining whether the identification of sender in the electronic mail message is in the list of the identifications of the senders who are authorized. When the sender of the electronic mail message is determined to be authorized, the system stores the electronic mail message in an Inbox folder. When the sender of the electronic mail message is determined to be not authorized, the system stores the electronic mail message in a Junk Mail folder. In this way, the electronic mail messages are automatically stored in the appropriate folder based on whether the sender is authorized so that the user can view the Inbox folder containing the electronic mail messages sent by authorized senders separately from the Junk Mail folder containing the electronic mail messages sent by unauthorized senders.

23 Claims, 3 Drawing Sheets

U.S. PATENT DOCUMENTS

| | | | | |
|---|---|---|---|---|
| 6,092,101 | A | 7/2000 | Birrell et al. | 709/206 |
| 6,189,026 | B1 * | 2/2001 | Birrell et al. | 709/206 |
| 6,453,327 | B1 * | 9/2002 | Nielsen | 715/205 |
| 6,615,241 | B1 * | 9/2003 | Miller et al. | 709/206 |
| 7,222,159 | B2 * | 5/2007 | Miller et al. | 709/206 |
| 7,386,591 | B2 * | 6/2008 | Miller et al. | 709/206 |
| 2005/0081059 | A1 * | 4/2005 | Bandini et al. | 713/201 |

OTHER PUBLICATIONS

Quarterman, John S., *The Internet Connection: System Connectivity and Configuration*, 1994, Texas Internet Consulting, U.S.A., Chapter 7.

Seminerio, Maria, "Spam Wars head to Congress," May 22, 1997, *ZDDNN*, http://www5.zdnet.com/zdnn/content/zdnn/0522/zdnn0009.html, pp. 1-2.

Microsoft Corporation, "Excerpts from On-line documentation of Microsoft Exchange," Version 5.0.1458.47, 1986-1997, 11 pp.

Collora et al., *Special Edition—Using Microsoft Exchange Server*, Que Corporation, Indianapolis, IN, 1996, pp. 693-703.

P. Maes, "Agents that Reduce Work and Information Overload," Jul. 1994, pp. 31-40.

http://mercea.net./~exmh/html/exmh-users/1996-02/msg00023.html.

http://www.math.uiuc.edu/consult/use_system/procfilt.html.

* cited by examiner

METHOD AND SYSTEM FOR FILTERING UNAUTHORIZED ELECTRONIC MAIL MESSAGES

CROSS-REFERENCE TO RELATED APPLICATIONS

This application is a continuation of U.S. patent application Ser. No. 11/080,104, filed Mar. 14, 2005, which is a continuation of U.S. patent application Ser. No. 09/634,691, filed Aug. 8, 2000, U.S. Pat. No. 6,868,436, which is a continuation of U.S. patent application Ser. No. 08/909,811, filed Aug. 12, 1997, U.S. Pat. No. 6,249,805. These applications are incorporated by reference herein in their entirety and for all purposes.

TECHNICAL FIELD

This invention relates generally to electronic mail systems and more particularly to the filtering of electronic mail messages.

BACKGROUND OF THE INVENTION

Electronic mail is becoming an increasingly popular form of communications. Electronic mail systems allow one user of a computer system (i.e., a sender) to send a message electronically to another user (i.e., a recipient). To create an electronic mail message, the sender designates the recipient to whom the electronic mail is to be sent and creates the body (e.g., text) of the electronic mail message. The electronic mail system then forwards the electronic mail message to the recipient via a communications mechanism such as a local area network or the Internet. When the recipient receives the electronic mail messages, the recipient can view the body of the electronic mail message.

To ensure format compatibility among various electronic mail systems, the electronic mail messages are formatted in accordance with a conventional format such as defined by the Simple Mail Transfer Protocol ("SMTP"). According to this format, the electronic mail message contains an envelope portion and a body portion. The envelope portion identifies the sender and the recipient, identifies the electronic mail address of the recipient, and may identify the subject of the electronic mail message. The body portion contains the message itself, which is typically in text format. The electronic mail system may need to route an electronic mail message through various computer systems until it reaches the computer system of the recipient. Each of the computer systems through which the electronic mail message is routed use the recipient's electronic mail address to forward the electronic mail message.

Electronic mail systems store electronic mail messages that have been sent or received in a file referred to as the electronic mail file. The electronic mail files are typically organized into various folders and subfolders. The folders allow a user of the electronic mail system to store related electronic mail messages in the same folder in a way that is very similar to how directories allow a user of a file system to store related files in the same directory. When the electronic mail system receives an electronic mail message for a user, the electronic mail system stores the electronic mail message in a folder that is designated as the "Inbox" folder within the user's electronic mail file. The electronic mail system allows the user to view the electronic mail messages that are currently in the Inbox folder. When the user selects to display the contents of the Inbox folder, the electronic mail system displays information from the envelope portion (e.g., sender's name and subject information) for each of the electronic mail messages currently in the folder. Based on the envelope information, the user can select to display the body of an electronic mail message. The electronic mail system also allows the user to move the electronic mail messages from the Inbox folder to other folders or to delete the electronic mail messages. When a user sends an electronic mail message, the electronic mail system typically saves a copy of the electronic mail message in a folder that is designated as the "Sent" folder. The user can move and delete the electronic mail messages stored in any of the folders in the same manner as done for the Inbox folder.

The electronic mail address for a user uniquely identifies the computer system at which the recipient expects to receive the electronic mail messages. Electronic mail addresses can be very complex strings of characters that identify countries, companies, divisions within companies, and individual users. Thus, to provide a more friendly user interface, typical electronic mail systems maintain an address book that contains a mapping of the names of the users to their electronic mail addresses. Thus, when a user wishes to designate a recipient, the user need only indicate the name of the recipient and the electronic mail system uses the address book to retrieve the electronic mail address for that recipient. A user will generally have a personal address book with the names and electronic mail addresses of those recipients to whom the user normally sends electronic mail messages. In addition, the electronic mail systems typically maintain a global address book that is shared by all users of the electronic mail system. For example, the global address book may contain the names and electronic mail addresses of all the employees of a company. An employee may then store the names and electronic mail addresses of non-employee friends in the employee's own personal address book. When the electronic mail system sends an electronic mail message, it searches the global and personal address books for the electronic mail address of the recipient.

Prior to the popularity of the Internet, a user of an electronic mail system generally received electronic mail messages only from known senders. For example, an employee of a company would receive electronic mail messages only from other employees of the company. The electronic mail system may only be connected to computer systems owned by the company. However, with the increasing popularity of the Internet, a user may be able to send electronic mail messages to anyone who is connected to the Internet. The sender of an electronic mail message needs only to know the electronic mail address of the recipient. Thus, users can and often do receive electronic mail messages from unknown senders.

Recently, a problem has developed which seriously impairs the effectiveness of electronic mail systems. Many large promotional companies are turning to the Internet to advertise products of their clients. These promotional companies acquire and maintain lists of electronic mail addresses for thousands of users. When a client wants to advertise a product, the promotional company will send an electronic mail message to each electronic mail address in its list. A user may occasionally receive an unsolicited electronic mail message from such a promotional company. Such occasional receipt of such electronic mail message, while annoying, does not seriously impair the effectiveness of the electronic mail system. However, because of the perceived benefits of advertising via the Internet, a user may now receive so many unsolicited electronic mail messages on a daily basis, that the unsolicited electronic mail messages vastly outnumber the electronic mails messages received from known senders. The process of sending these promotional electronic mail messages indiscriminately to the various electronic mail addresses by the promotional companies is referred to as "spamming." Because a recipient may receive so many unsolicited (i.e., junk) electronic mail messages, it may be very difficult for the recipient to sort through and determine which electronic mail messages are not junk. Such sorting has been a serious impediment to the effectiveness of the electronic mail systems. The seriousness of the problem has been recognized and legislation has even been proposed that would outlaw such spamming practices. In addition, several litigations have been spawned to force such promotional companies to cease their spamming practices.

One potential solution to the problems resulting from the spamming practices has been tried, but unfortunately has been unsuccessful. A service, known as a "de-spamming service," has been provided that attempts to limit the junk mail that is sent. Such a de-spamming service maintains a list of the electronic mail addresses of users who have requested not to receive junk mail. When a promotional company wishes to send an electronic mail message to all the users whose electronic mail addresses are on its mailing list, the promotional company first sends the electronic mail messages to the de-spamming computer system. The de-spamming computer system checks its list of electronic mail addresses and deletes any of the electronic mail messages that are destined to any electronic mail addresses on its list. The de-spamming computer system then forwards the remaining electronic mail messages onto the recipients. Whenever a recipient does not want to be included on a mailing list, the recipient can notify the de-spamming computer system, which will add the recipient's electronic mail address to the list of electronic mail addresses that are not to receive junk mail. Recently, however, such de-spamming services have ceased offering the service because it has proved to be uneconomical.

Certain electronic mail systems also allow a user to designate how to automatically handle a received electronic mail message. For example, a user can indicate that all electronic mail messages received from a certain sender can automatically be stored in a designated folder, be deleted, or be forwarded to another recipient. To provide such routing of electronic mail messages, the user needs to specify a characteristic (e.g., sender=John Smith) of the envelope portion or the body portion so that the electronic mail system can determine which electronic mail systems satisfy the characteristic. However, with such electronic mail systems, a user cannot specify how to automatically handle electronic mail messages if they are unaware of any characteristic of the electronic mail message. In particular, a user may not know in advance the identity of the sender of junk mail and thus cannot have the junk mail automatically deleted.

DETAILED DESCRIPTION OF THE INVENTION

Figure 1:
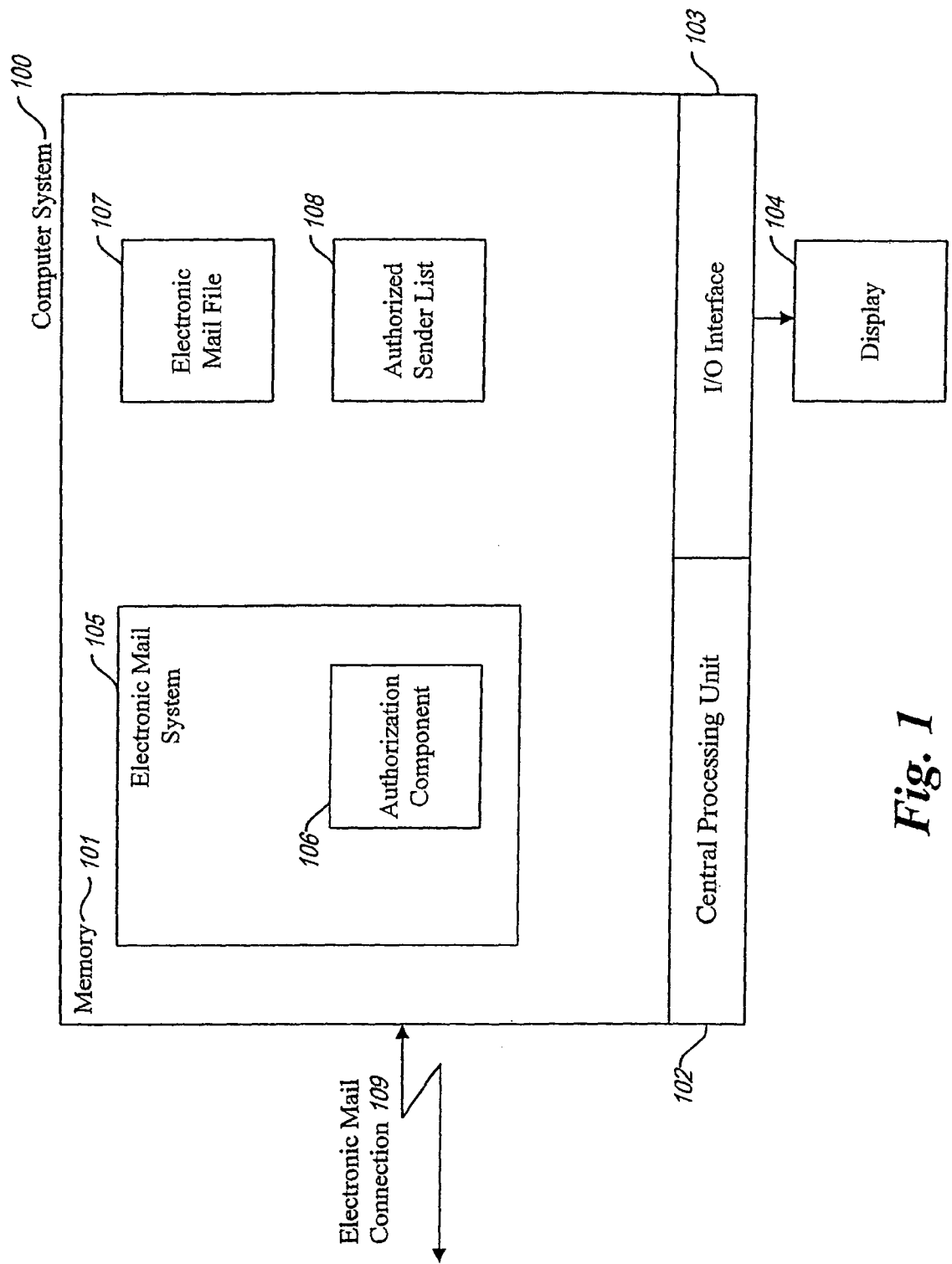
FIG. 1 is a block diagram illustrating a computer system for practicing the present invention.

The present invention provides a method and system for filtering electronic mail messages that are received from unauthorized senders. In one embodiment of the present invention, an authorization component is included with an electronic mail system. The authorization component intercepts electronic mail messages that are sent to a user before they are placed in the user's Inbox folder. The authorization component has the identifications of all senders who are authorized to send electronic mail messages to the user. When an electronic mail message is intercepted, the authorization component retrieves the identification of the sender from the envelope portion of the intercepted electronic mail message. The authorization component then determines whether the retrieved identification of the sender matches the identification of one of the authorized senders. If the retrieve identification does not match, then the authorization component stores the intercepted electronic mail message in a pre-designated location, such as a "Junk Mail" folder. Otherwise, the authorization component forwards the intercepted electronic mail message to the electronic mail system for normal processing and storage. With the use of such an authorization component a user can effectively filter out unauthorized (i.e., junk) electronic mail messages. Periodically, the user can view the Junk Mail folder to delete or read the electronic mail messages that were designated as junk.

The authorization component can store the identifications of the authorized senders in a list that is either manually or automatically updated. A user can manually update the authorized sender list in several circumstances. For example, when an electronic mail message is stored in the Junk Mail folder but the user does not consider the electronic mail message to be junk, the user can add the identification of the sender to the authorized sender list. Conversely, when an electronic mail message is not stored in the Junk Mail folder but the user considers the electronic mail message to be junk, the user can remove the identification of the sender from the authorized sender list. The authorization component can also automatically update the authorized sender list in several circumstances. For example, the authorization component can scan previously sent electronic mail messages and add the identifications of the recipients to the authorized sender list. The authorization component can also scan previously received electronic messages (e.g., in a certain folder) and add the identifications of the senders to the authorized sender list. In addition, the authorization component can automatically add the identification of each recipient to the authorized sender list whenever the user sends an electronic mail message. The authorization component can also allow the user to disable the filtering of electronic mail messages. It may be desirable to disable such filtering, for example, when the authorized sender list has not yet been updated to contain the identification of most of the authorized senders.

The authorization component can be used by an administrator of an electronic mail system of a company to ensure that the employees do not receive unauthorized electronic mail messages. For example, the administrator could maintain a global authorized sender list that is shared by all employees. The authorized sender list could contain only the names of the employees of the company. If the authorization component automatically deleted the electronic mail messages from senders not in the authorized sender list, then the employees would only receive electronic mail messages sent by other employees. Alternatively, the global authorized sender list can serve to relieve each individual employee of maintaining an authorized sender list with the names of all employees. Each employee could also maintain a personal authorized sender list that identifies additional senders (e.g., spouse) who are authorized to send electronic mail messages to the employee. The authorization component would only consider an electronic mail message to be junk when the identification of the sender is not in either the global or the personal authorized sender list. A user may be allowed to specify and despecify many different authorized sender lists at various times. For example, a user may have an authorized sender list for business acquaintances and another authorized sender list for social acquaintances.

The authorization component can handle the electronic mail message from unauthorized senders in different ways other than automatically storing in a Junk Mail folder or deleting. For example, electronic mail messages received from a sender who is not an employee of a company can automatically be routed to the electronic mail system administrator. Also, all electronic mail messages from unauthorized senders can be automatically forwarded to an assistant of the user who can determine whether the electronic mail message is really junk. If the electronic mail message is not junk, then the assistant can re-send the electronic mail message to the user and update the authorized sender list for the user accordingly. Also, the authorization component can simply store an indication that indicates whether or not an electronic mail message is from an authorized sender. When the electronic mail system displays electronic mail messages, it can display a visual indicator as to whether each electronic mail message is junk based on the stored indication. For example, the visual indication could be the displaying of information relating to the junk electronic mail messages in a dimmer intensity than the non-junk electronic mail messages.

FIG. 1 is a block diagram illustrating a computer system for practicing the present invention. The computer system 100 includes memory 101, central processing unit 102, I/O interface 103, display device 104, and electronic mail connection 109. The memory contains the electronic mail system 105 which includes the authorization component 106 of the present invention. The electronic mail system passes each electronic mail message it receives to the authorization component. The authorization component uses the authorized sender list 108 to determine whether the sender of the electronic mail message is authorized to send the received electronic mail message. If the sender is not authorized, the authorization component stores the received electronic mail message in a designated Junk Mail folder in the electronic mail file 107. The authorization component can operate as an add-on component to any system (e.g., Internet browsers) that supports the receiving of electronic mail messages.

Figure 2:
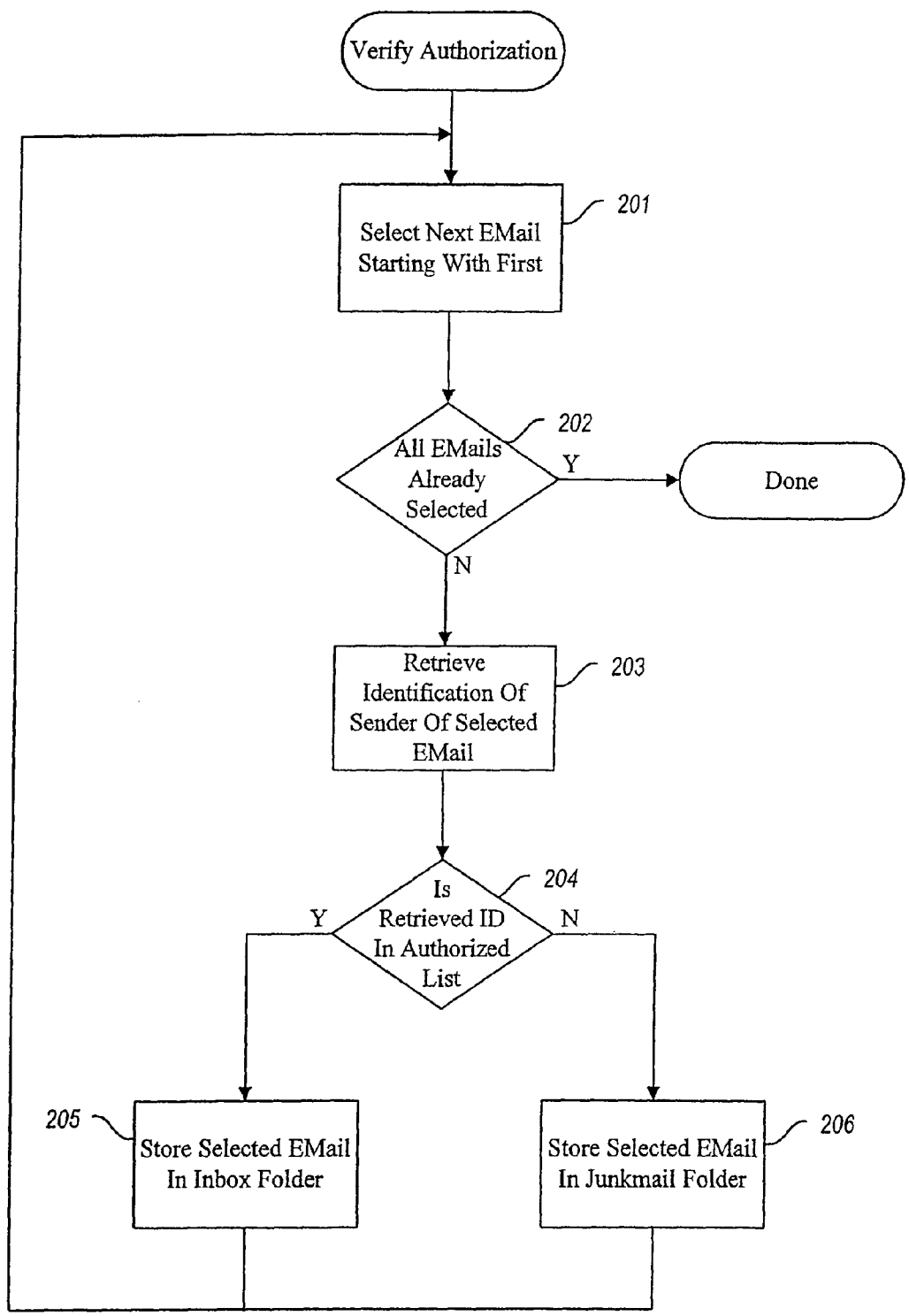
FIG. 2 is a flow diagram of a routine that provides an implementation of the authorizing for the authorization component.

FIG. 2 is a flow diagram of a routine that provides an implementation of the authorizing for the authorization component. This routine receives the authorized sender list and the electronic mail messages. The routine determines whether the identification of the sender of each electronic mail message is in the authorized sender list. If the sender is authorized, then the routine stores the electronic mail message in a designated folder for authorized senders. If the sender is not authorized, then the routine stores the electronic mail message in a Junk Mail folder. In step 201, the routine selects the next electronic mail message starting with the first. In step 202, if all the electronic mail messages have already been selected, then the routine is complete, else the routine continues at step 203. In step 203, the routine retrieves the identification of the sender of the selected electronic mail message. In step 204, if the retrieved identification is in the authorized sender list, then the routine continues at step 205, else the routine continues at step 206. In step 205, the routine stores the selected electronic mail message in the Inbox folder and loops to step 201 to select the next electronic mail message. In step 206, the routine stores the selected electronic mail message in the Junk Mail folder and loops to step 201 to select the next electronic mail message.

Figure 3:
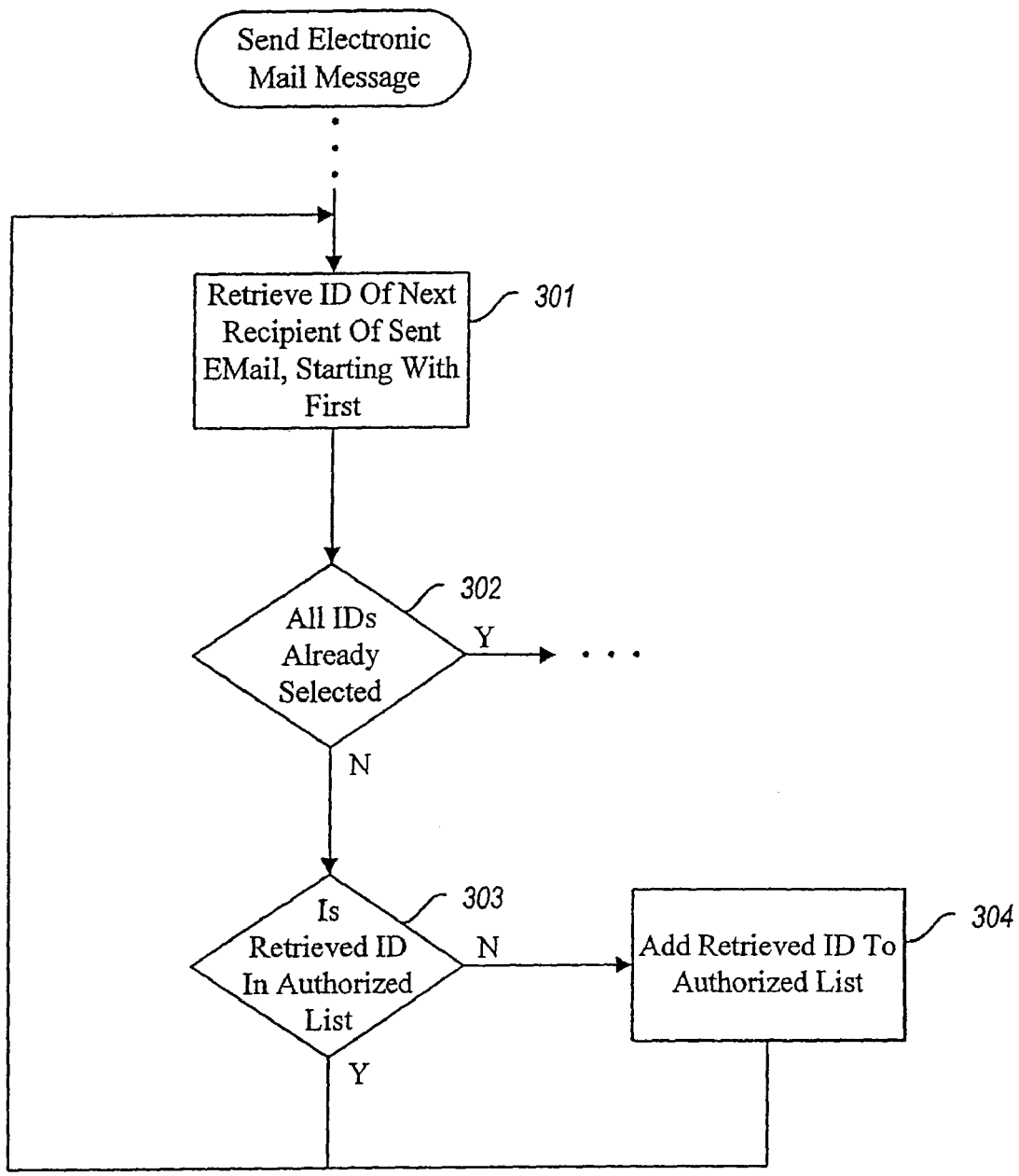
FIG. 3 is a flow diagram of a routine that provides an implementation of the automatic updating of the authorized senders list.

FIG. 3 is a flow diagram of a routine that provides an implementation of the automatic updating of the authorized sender list. This flow diagram shows the portion of the authorization component that adds the recipients of a sent electronic mail message to the authorized sender list for the sender of the electronic mail message. The ellipsis shown in the figure indicates conventional processing to send an electronic mail message. In step 301, the routine retrieves the identification of the next recipient of the electronic mail message to be sent starting with the first. In step 302, if the identifications of all the recipients of the electronic mail message to be sent have already been selected, then the routine continues with the sending of the electronic mail message, else the routine continues at step 303. At step 303, if the retrieved identification is already in the authorized sender list, then the routine loops to step 301 to retrieve the identification of the next recipient, else the routine continues at step 304. In step 304, the routine adds the retrieved identification to the authorized sender list and loops to step 301 to select the next recipient.

From the foregoing it will be appreciated that, although specific embodiments of the invention have been described herein for purposes of illustration, various modifications may be made without deviating from the spirit and scope of the invention. Accordingly, the invention is not limited except as by the appended claims.

The invention claimed is:

1. A computer system having a default location for storing received electronic mail messages each of which includes a respective identification of a sender of the electronic mail message, the computer system comprising:

a storage device retaining a record of the identifications of the senders who are authorized to send an electronic mail message to the user; and a processing system operable to compare the identification of a sender of each electronic mail message with the record of the identifications retained in the storage device to determine that the sender of the electronic mail message is authorized responsive to a comparison match and to determine that the sender of the electronic mail message is unauthorized in the absence of a comparison match, the processing system being operable to cause the electronic mail message to be stored in the default location only if the sender of the electronic mail message is determined to be authorized, the processing system being operable to forward the received electronic mail message to an other user if the sender of the electronic mail message is determined to be unauthorized, the processing system further being operable to allow the user to receive the electronic mail message responsive to the other user providing an indication that the electronic mail message should be viewed by the user even though the electronic mail message was sent by an unauthorized sender.

2. The computer system of claim 1 wherein the default location comprises a message folder.

3. The computer system of claim 2 wherein the default location comprises an in-box message folder.

4. The computer system of claim 1 wherein the processing system if operable to automatically delete any electronic mail message received from an unauthorized sender.

5. A computer system receiving electronic mail messages each of which has a sender, the computer system including a personal list of authorized senders that is personalized to a recipient, the computer system comprising:

a system for filtering unauthorized received electronic mail messages, the system including a list generator for automatically generating a list of senders authorized to send electronic mail messages, the list being shared by multiple recipients of electronic mail messages; and a processor operable for each of a plurality of received electronic mail messages to determine whether the sender of the electronic mail message is designated as being authorized by determining whether the sender is in the generated list of authorized senders and determining whether the sender of the electronic mail message is designated as being unauthorized by determining that the sender is not in either list;

wherein electronic mail messages from senders that are designated as unauthorized are stored in a first location, and messages from senders that are designated as authorized are stored in a different location that said first location; and wherein the processor is further operable to allow a user to receive an electronic mail message responsive to another user providing an indication that the electronic mail message should be viewed by the user from the first location even though the electronic mail message was designated as being authorized.

6. The computer system of claim 5 wherein the system for filtering unauthorized received electronic mail messages is operable to generate the list of authorized senders by adding the senders of previously received electronic mail messages to the list.

7. The computer system of claim 5 wherein the system for filtering unauthorized received electronic mail messages is operable to generate the list of authorized senders by adding the recipients of previously sent messages to the list.

8. A non-transitory computer readable storage apparatus having at least one computer program disposed thereon, the at least one program configured to, when executed:

evaluate a first electronic message sent from a sender, the first electronic message addressed to a user, the evaluation determining that an identity of the sender is on a first list of pre-approved sender identities; and make the first electronic message available to be selectively viewed by the user from a first directory location when the identity of the sender is on the first list, the first directory location comprising a primary directory location from which electronic messages received by the user and not determined to be junk are to be selected for initial viewing by the user; and wherein the at least one computer program is further configured to, when executed, make the first electronic message available to be selectively viewed by the user from a second directory location separate from the first directory location when it is determined that the identity of the sender is not on the first list, the second directory location comprising a directory location from which electronic messages received by the user and determined to be junk are to be selected for initial viewing by the user; and wherein the at least one computer program is further configured to, when executed, allow the user to receive an electronic mail message responsive to another user providing an indication that the electronic mail message should be viewed by the user from the first directory location even though the electronic mail message was sent by an unauthorized sender.

9. The computer readable apparatus of claim 8, wherein the at least one computer program is further configured to provide a visual indication to the user that the identity of the sender of the first electronic message is not on the first list when it is determined that the identity of the sender is not on the first list, the visual indication visually identifying the first electronic message from among other electronic messages in a list of electronic messages in the first directory location.

10. The computer readable apparatus of claim 9, wherein the provision of the visual indication is performed if it is further determined that the first electronic message comprises junk.

11. The computer readable apparatus of claim 8, wherein the making of the first electronic message available to be selectively viewed by the user from the first directory location is performed regardless of whether or not the first electronic message is determined to be junk.

12. The computer readable apparatus of claim 8, wherein the making of the first electronic message available to be selectively viewed by the user from the second directory location is performed if it is further determined that the first electronic message comprises junk.

13. The computer readable apparatus of claim 11, wherein the at least one program is further configured to provide the user with an option to enable the making of the first electronic message available from the second directory location to be performed regardless of whether or not the first electronic message is otherwise determined to be junk.

14. The computer readable apparatus of claim 13, wherein the making of the first electronic message available to be selectively viewed by the user from the first directory location is performed regardless of whether or not the first electronic message is determined to be junk.

15. The computer readable apparatus of claim 11, wherein the at least one program is further configured to enable the user to add the identity of the sender to the first list upon the user identifying the electronic message in the second directory location.

16. The computer readable apparatus of claim 15, wherein the at least one program is further configured to enable the user to remove the identity of the sender from the first list upon the user identifying the electronic message in the first directory location.

17. The computer readable apparatus of claim 8, wherein:
the at least one program is further configured to separately determine if the identity of the sender is on a second list of pre-approved send identities, the making of the first electronic message available to be selectively viewed by the user from the first directory location being performed when it is determined that the identity of the sender is on the second list; and the wherein the at least one program is further configured to is configured to share the second list of pre-approved sender identities among a plurality of users, the first list of pre-approved sender identities being personal to the user.

18. The computer readable apparatus of claim 8, wherein the at least one program is further configured to share the first list of pre-approved sender identities among multiple users.

19. The computer readable apparatus of claim 8, wherein the first list of pre-approved sender identities is unmodifiable by the user.

20. The computer readable apparatus of claim 8, wherein the first list of pre-approved sender identities comprises a combination of first sender identities denoted by the user as business-related, and second sender identities denoted by the user as social-related.

21. The computer readable apparatus of claim 8, wherein the at least one program is further configured to:

send a second electronic message from the user, addressed to a recipient; and automatically add an identity of the recipient to the first list.

22. The computer readable apparatus of claim 8, wherein the at least one program is further configured to provide the user with an option to automatically update the first list of pre-approved sender identities with a block of pre-existing identities.

23. The computer readable apparatus of claim 22, wherein the block of identities corresponds to recipients of electronic messages previously sent by the user.

* * * * *